(12) United States Patent
Xu (10) Patent No.: US 11,132,555 B2
(45) Date of Patent: Sep. 28, 2021

(54) VIDEO DETECTION METHOD, SERVER AND STORAGE MEDIUM

(71) Applicant: Tencent Technology (Shenzhen) Company Limited, Shenzhen (CN)

(72) Inventor: Xuyuan Xu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 125 days.

(21) Appl. No.: 16/190,035

(22) Filed: Nov. 13, 2018

(65) Prior Publication Data

US 2019/0080177 A1    Mar. 14, 2019

Related U.S. Application Data

(63) Continuation-in-part of application No. PCT/CN2017/088240, filed on Jun. 14, 2017.

(30) Foreign Application Priority Data

Jun. 22, 2016  (CN) .......................... 201610457780.1

(51) Int. Cl.
*G06K 9/00* (2006.01)
*G06F 16/00* (2019.01)
(Continued)

(52) U.S. Cl.
CPC ......... *G06K 9/00744* (2013.01); *G06F 16/00* (2019.01); *G06F 16/735* (2019.01);
(Continued)

(58) Field of Classification Search
CPC .. G06F 3/04842; G06F 16/683; G06F 3/0482; G06F 16/955; G06F 16/433;
(Continued)

(56) References Cited

U.S. PATENT DOCUMENTS

| 8,717,499 B2 | 5/2014 | Bloom et al. |
| 2013/0054645 A1* | 2/2013 | Bhagavathy .......... G06F 16/783 707/780 |

(Continued)

FOREIGN PATENT DOCUMENTS

| CN | 102890778 A | 1/2013 |
| CN | 103051925 A | 4/2013 |

(Continued)

OTHER PUBLICATIONS

Tian Yonghong et al: "Video Copy-Detection and Localization with a Scalable Cascading Framework", IEEE Multimedia, IEEE Service Center, New York, NY, US, vol. 20, No. 3, Jul. 1, 2013 (Jul. 1, 2013), pp. 72-86, XP011525049, ISSN: 1070-986X, DOI: 10.1109/MMUL.2012.62 (Year: 2013).*

(Continued)

*Primary Examiner* — Golam Sorowar
(74) *Attorney, Agent, or Firm* — Morgan, Lewis & Bockius LLP (57) ABSTRACT

Embodiments of this application disclose a video detection method and a server. The method includes: obtaining first video data to be detected; decoding the first video data, to obtain audio data of the first video data; analyzing and identifying the audio data, to obtain audio fingerprint data corresponding to the audio data; querying an audio fingerprint library; obtaining a video label and a time parameter corresponding to the audio data when the audio fingerprint library comprises the audio fingerprint data; querying a video copyright library, to obtain a first picture that is corresponding to the video label and that satisfies the time parameter, and extracting a second picture that is in the first video data and that satisfies the time parameter; separately extracting a first feature parameter of the first picture and a second feature parameter of the second picture; and comparing the first feature parameter with the second feature (Continued)

parameter, and determining, based on a comparison result, whether the first video data is consistent with a video in the video copyright library.

14 Claims, 7 Drawing Sheets

(51) Int. Cl.
*G06F 16/783* (2019.01)
*G06F 16/735* (2019.01)
*G06K 9/46* (2006.01)
*G06K 9/62* (2006.01)
*G10L 25/51* (2013.01)
*G10L 25/54* (2013.01)

(52) U.S. Cl.
CPC ..... *G06F 16/7834* (2019.01); *G06K 9/00758* (2013.01); *G06K 9/4604* (2013.01); *G06K 9/6202* (2013.01); *G06K 9/6215* (2013.01); *G10L 25/51* (2013.01); *G06K 9/4647* (2013.01); *G06K 9/6232* (2013.01); *G10L 25/54* (2013.01)

(58) Field of Classification Search
CPC ...... G06F 16/40; G06F 16/43; G06F 16/7847; G06F 16/78; G06F 16/183; G06F 16/5838; G06F 16/7867; G06F 16/9562; G06F 16/958; G06F 16/68; G06F 16/7834; G06F 16/13; G06F 16/1787; G06F 16/2246; G06F 16/23; H04N 21/4622; H04N 21/242; H04N 21/8358; H04N 21/233; H04N 21/2393; H04N 21/8173; H04N 21/84; H04N 21/4325; H04N 21/4334; H04N 21/4627; H04N 21/47214; H04N 21/4782; H04N 21/812; H04N 21/8166; H04N 7/17318; H04N 21/2223; H04N 21/4312; H04N 21/4394; G06K 9/00711; G06K 9/00758; G06K 9/00744; G06K 9/6215; G06K 9/6201; G06K 9/00; G06K 9/4642; G06K 9/4671; G06K 19/06037; G06K 19/06046; G06K 19/14; G06K 19/18; G06K 2019/06253; G06K 7/1417; G06K 7/1447; G06K 9/00335; G06K 9/00442; G06K 9/4604; G06K 9/4647

See application file for complete search history.

(56) References Cited

U.S. PATENT DOCUMENTS

| | | | | |
|---|---|---|---|---|
| 2014/0199050 | A1* | 7/2014 | Khalsa | H04N 9/8205 386/280 |
| 2015/0365722 | A1* | 12/2015 | Oztaskent | H04N 21/4722 725/18 |
| 2016/0286171 | A1* | 9/2016 | Cheng | G08B 13/19602 |

FOREIGN PATENT DOCUMENTS

| | | | |
|---|---|---|---|
| CN | 105554570 A | * | 5/2016 |
| CN | 105554570 A | | 5/2016 |
| CN | 106126617 A | | 11/2016 |

OTHER PUBLICATIONS

Tencent Technology, ISRWO, PCT/CN2017/088240, dated Aug. 23, 2017, 7 pgs.

Tencent Technology, IPRP, PCT/CN2017/088240, dated Dec. 25, 2018, 6 pgs.

* cited by examiner

VIDEO DETECTION METHOD, SERVER AND STORAGE MEDIUM

PRIORITY CLAIM AND RELATED APPLICATION

This application is a continuation-in-part application of PCT/CN2017/088240, entitled "VIDEO DETECTION METHOD AND SERVER" filed on Jun. 14, 2016, which claims priority to Chinese Patent Application No. 201610457780.1, filed with the State Intellectual Property Office of the People's Republic of China on Jun. 22, 2016, and entitled "VIDEO DETECTION METHOD AND SERVER", all of which are incorporated herein by reference in their entirety.

FIELD OF THE TECHNOLOGY

This application relates to video data processing technologies, and specifically, to a video detection method, a server and a storage medium.

BACKGROUND OF THE DISCLOSURE

Video copy detection becomes a hot topic researched by people because of a copyright protection problem of digital videos. In the existing technology, usually, two of the following solutions are used to detect whether a video infringes the copyright: A first solution is to detect audio of the video. However, the same audio may have the copyright of different videos, for example, a music video (MV). The copyright of the audio protects only audio data. Consequently, a copyright protection requirement for video data cannot be met if copyright protection is only performed on audio. The second solution is to detect images of a video. Compared with the audio data, the video data has a large quantity of information. During detection, a large quantity of fingerprint features need to be calculated, so as to be compared with fingerprint features in a copyright library. This needs a strong calculation capability and needs to consume a large quantity of calculation resources.

SUMMARY

To resolve a currently-existing technical problem, embodiments of this application provide a video detection method and a server. A video data copyright protection requirement is met, in addition, a strong calculation capability is not needed and calculation resource consumption is reduced.

An embodiment of this application provides a video detection method, including:

obtaining, by a server, first video data to be detected, and decoding, by the server, the first video data, to obtain audio data of the first video data;

analyzing and identifying, by the server, the audio data, to obtain audio fingerprint data corresponding to the audio data; and querying, by the server based on the audio fingerprint data, an audio fingerprint library;

obtaining, by the server, a video label and a time parameter corresponding to the audio fingerprint data when the audio fingerprint library includes the audio fingerprint data;

querying, by the server, a video copyright library based on the video label, to obtain a first picture that is corresponding to the video label and that satisfies the time parameter, and extracting a second picture that is in the first video data and that satisfies the time parameter;

separately extracting, by the server, a first feature parameter of the first picture and a second feature parameter of the second picture; and comparing, by the server, the first feature parameter with the second feature parameter, and determining, based on a comparison result, whether the first video data is consistent with a video in the video copyright library.

In the foregoing solution, before the querying, by the server, a video copyright library based on the video label, the method includes:

performing, by the server, picture extraction on second video data having copyright, and storing the extracted picture, a time parameter corresponding to the picture, and a video label corresponding to the picture in the video copyright library.

In the foregoing solution, the performing, by the server, picture extraction on second video data having copyright includes:

performing, by the server, scene identification on the second video data, and identifying and filtering a first picture collection representing scene switching in the second video data, to obtain a second picture collection;

analyzing and identifying, by the server, a picture in the second picture collection, to obtain edge feature information of the picture in the second picture collection; and extracting, by the server, a picture of which a quantity of the edge feature information reaches a preset threshold.

In the foregoing solution, the extracting, by the server, a picture of which a quantity of the edge feature information reaches a preset threshold includes:

generating, by the server, the picture of which the quantity of the edge feature information reaches the preset threshold into a third picture collection; and extracting, by the server, a picture in the third picture collection at a preset time interval.

In the foregoing solution, the analyzing and identifying, by the server, the audio data, to obtain audio fingerprint data corresponding to the audio data includes:

extracting, by the server, a feature parameter of the audio data, and obtaining, based on the feature parameter, the audio fingerprint data corresponding to the audio data.

In the foregoing solution, the separately extracting, by the server, a first feature parameter of the first picture and a second feature parameter of the second picture includes:

separately extracting the first feature parameter of the first picture and the second feature parameter of the second picture according to at least one of the following manners: a scale-invariant feature transform (SIFT) manner and a histogram of oriented gradient (HOG) manner.

In the foregoing solution, the comparing, by the server, the first feature parameter with the second feature parameter, and determining, based on a comparison result, whether the first video data is consistent with a video in the video copyright library includes:

calculating, by the server, similarity between the first feature parameter and the second feature parameter; and determining, by the server, that the first video data is consistent with the video in the video copyright library when the similarity reaches a preset threshold.

An embodiment of this application further provides a server, including: an audio processing module, an audio fingerprint storage module, a video processing module and a video copyright storage module.

The audio processing module is configured to: obtain first video data to be detected; decode the first video data, to obtain audio data of the first video data; analyze and identify the audio data, to obtain audio fingerprint data corresponding to the audio data; and is further configured to: query, based on the audio fingerprint data, the audio fingerprint storage module; and obtain a video label and a time parameter corresponding to the audio fingerprint data when an audio fingerprint library includes the audio fingerprint data.

The audio fingerprint storage module is configured to store the audio fingerprint data, and the corresponding video label and time parameter.

The video processing module is configured to: query the video copyright storage module based on the video label, to obtain a first picture that is corresponding to the video label and that satisfies the time parameter, and extract a second picture that is in the first video data and that satisfies the time parameter; separately extract a first feature parameter of the first picture and a second feature parameter of the second picture; and compare the first feature parameter with the second feature parameter, and determine, based on a comparison result, whether the first video data is consistent with a video in the video copyright library.

The video copyright storage module is configured to store the video label, and the corresponding picture and time parameter.

In the foregoing solution, the video processing module is further configured to: before the video copyright storage module is queried based on the video label, perform picture extraction on second video data having copyright, and store the extracted picture, a time parameter corresponding to the picture, and a video label corresponding to the picture in the video copyright storage module.

In the foregoing solution, the video processing module is configured to: perform scene identification on the second video data, identify and filter a first picture collection representing scene switching in the second video data, to obtain a second picture collection; analyze and identify a picture in the second picture collection, to obtain edge feature information of the picture in the second picture collection; extract a picture of which a quantity of the edge feature information reaches a preset threshold.

In the foregoing solution, the video processing module is configured to: generate the picture of which the quantity of the edge feature information reaches the preset threshold into a third picture collection; and extract a picture in the third picture collection at a preset time interval.

In the foregoing solution, the audio processing module is configured to extract a feature parameter of the audio data, and obtain, based on the feature parameter, the audio fingerprint data corresponding to the audio data.

In the foregoing solution, the video processing module is configured to separately extract the first feature parameter of the first picture and the second feature parameter of the second picture according to at least one of the following manners: a SIFT manner and a HOG manner.

In the foregoing solution, the video processing module is configured to calculate similarity between the first feature parameter and the second feature parameter; and determine that the first video data is consistent with the video in the video copyright library when the similarity reaches a preset threshold.

An embodiment of this application provides a computer storage medium, configured to store computer software instructions used by the foregoing server, and including steps for performing the foregoing video detection method.

In the video detection method and the server provided by the embodiments of this application, by combining audio content detection and video content detection, and by focusing mainly on audio content detection and subsidiarily on video content detection, calculation capabilities required when only video content detection is used are greatly decreased, calculation resource consumption is reduced, a copyright protection shortcoming by merely using an audio fingerprint is overcome, and a video copyright protection requirement is met.

DESCRIPTION OF EMBODIMENTS

With the development of Internet technologies, there are a growing number of video sharing platforms. A user may upload various video data that includes an MV, a short video, a TV play, a movie, a variety show video, an animation video, and the like. A video sharing platform server performs copyright detection on the video data uploaded by the user. Usually, there is a video copyright database. If content of the uploaded video data is consistent with that of video data in the video copyright database, the uploaded video data has a copyright conflict. Subsequently, an operation is performed on the video data having the copyright conflict or an uploader. For example, the video data having the copyright conflict is deleted, or a legal affair negation is performed with the uploaded under a serious circumstance. If the content of the uploaded video data is not consistent with that of the video data in the video copyright database, it may be determined that the video data is original video data made by the user. Copyright protection in an original and the like may be provided for the user.

Based on this, the following embodiments of this application are provided. A technical solution of the embodiments of this application describes a process of matching the uploaded video data with the video data in the video copyright database in detail.

The following describes this application in detail with reference to the accompanying drawings and specific embodiments.

Figure 1:
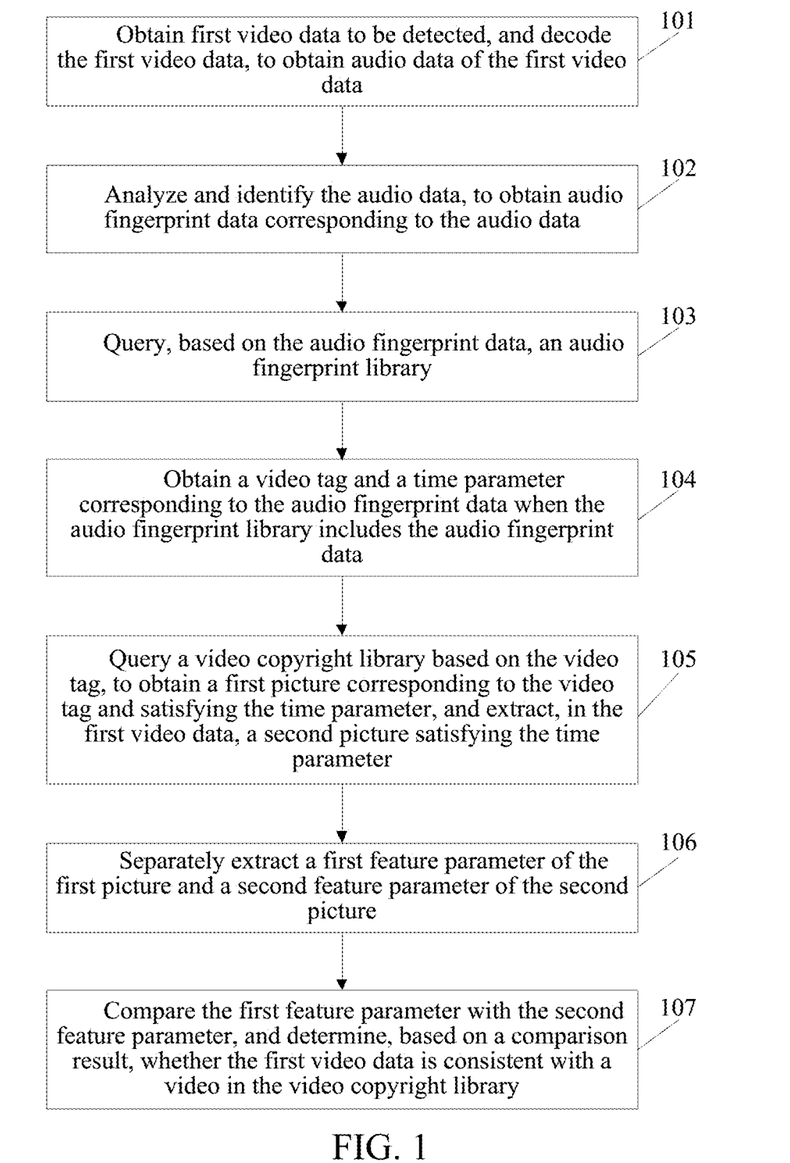
FIG. 1 is a schematic flowchart of a video detection method according to an embodiment of this application.

An embodiment of this application provides a video detection method. FIG. 1 is a schematic flowchart of a video detection method according to an embodiment of this application. As shown in FIG. 1, the video detection method includes:

Step 101: Obtain first video data to be detected, and decode the first video data, to obtain audio data of the first video data.

Step 102: Analyze and identify the audio data, to obtain audio fingerprint data corresponding to the audio data.

Step 103: Query, based on the audio fingerprint data, an audio fingerprint library.

Step 104: Obtain a video label and a time parameter corresponding to the audio fingerprint data when the audio fingerprint library includes the audio fingerprint data.

Step 105: Query a video copyright library based on the video label, to obtain a first picture that is corresponding to the video label and that satisfies the time parameter, and extract a second picture that is in the first video data and that satisfies the time parameter.

Step 106: Separately extract a first feature parameter of the first picture and a second feature parameter of the second picture.

Step 107: Compare the first feature parameter with the second feature parameter, and determine, based on a comparison result, whether the first video data is consistent with a video in the video copyright library.

The video detection method of this embodiment is applied to a video sharing platform server or a server cluster.

In step 101 of this embodiment, the first video data is video data to be detected, which may be specifically video data uploaded by a user, including an MV, a TV play, a movie, an animation video, or the like. The first video data is decoded to obtain the audio data of the first video data.

In step 102 of this embodiment, the audio data is analyzed and identified to obtain the audio fingerprint data corresponding to the audio data. The audio fingerprint data may be specifically quantized data representing a feature parameter of the audio data, and may be specifically represented by using a binary value. Specifically, the analyzing and identifying the audio data, to obtain audio fingerprint data corresponding to the audio data includes: extracting the feature parameter of the audio data, and obtaining based on the feature parameter, the audio fingerprint data corresponding to the audio data.

Figure 2A:
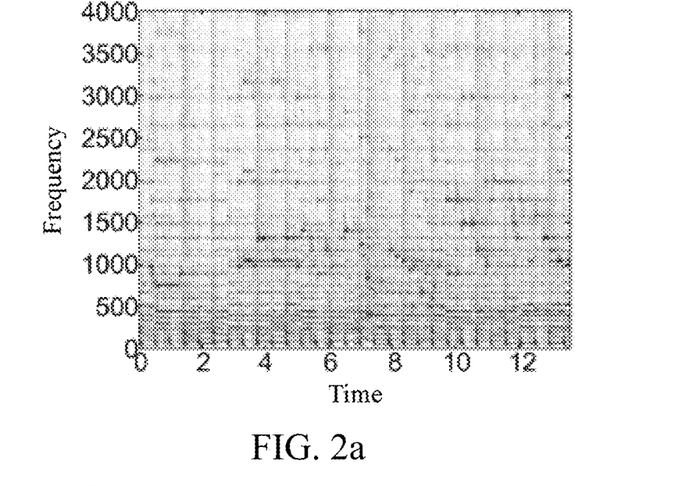
FIG. 2a to FIG. 2d are schematic diagrams of generating audio fingerprint data according to an embodiment of this application.
Figure 2B:
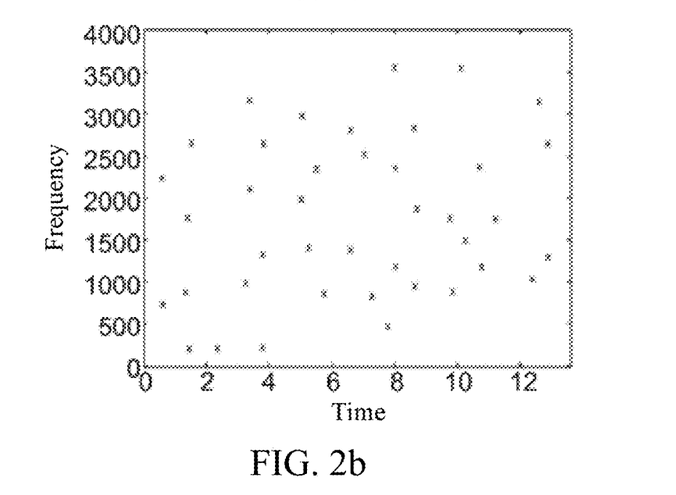
Figure 2C:
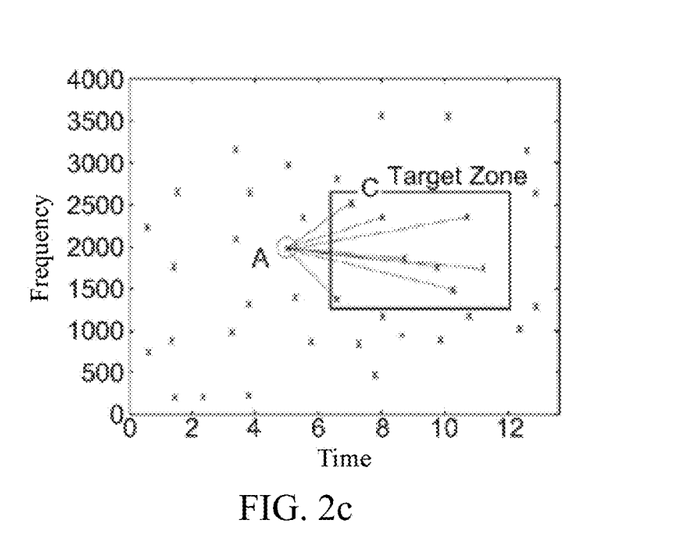
Figure 2D:
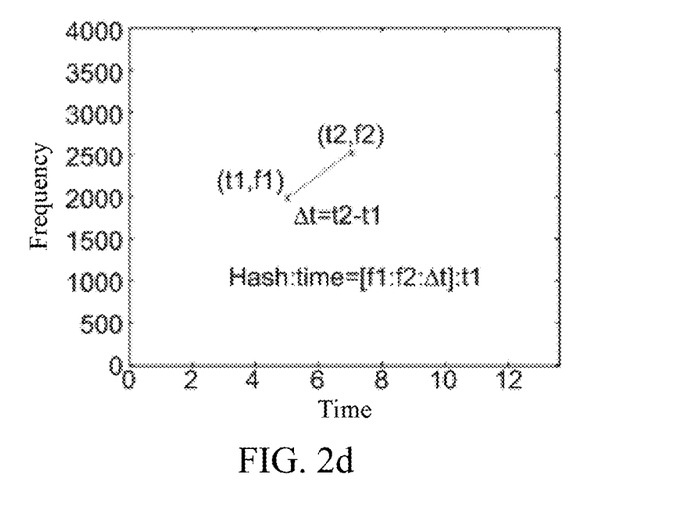
Figure 3:
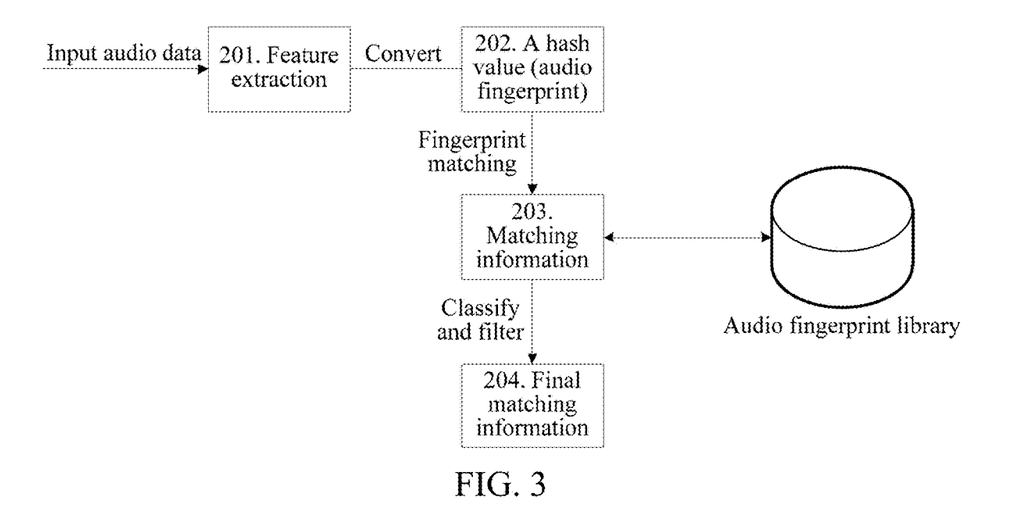
FIG. 3 is a schematic diagram of an extraction matching process of audio fingerprint data according to an embodiment of this application.

In an implementation, audio is a type of sound wave, so that the feature parameter of the audio data may be presented by using a sampling rate. Specifically, FIG. 2a to FIG. 2d are schematic diagrams of generating audio fingerprint data according to an embodiment of this application. FIG. 3 is a schematic diagram of an extraction matching process of audio fingerprint data according to an embodiment of this application. As shown by step 201 and step 202 in FIG. 3, the sampling rate of the audio data is converted to be K samples/s by converting the sampling rate. K is, for example, 8000. The collected audio data represented by one-dimensional time domain is converted into a two-dimensional diagram by using a short-time Fourier transform as shown in FIG. 2a. A feature point that is obviously extracted in the two-dimensional diagram shown in FIG. 2a is used as an obvious feature. For example, feature points in FIG. 2b are obtained by searching peaks in a frequency spectrum. For each selected feature point, for example, a feature point A, as shown in FIG. 2c, a proper window, for example, a window area 1 in FIG. 2c, is selected based on time and frequency to perform feature hash value conversion. Specifically, for example, for the feature point A, coordinates of the feature point A are (f1, t1). A feature point with a maximum frequency domain corresponding to a time is selected in the window area 1, for example, a feature point C. Coordinates of the feature point C are (f2, t2). A hash value formed by the feature point C and the feature point A may be Hash: time=[f1:f2:Δt]:t1, where Δt=t2−t1. In this embodiment, the obtained hash value is represented as a binary value, and the binary data specifically is the audio fingerprint data corresponding to the audio data.

Certainly, the method for obtaining audio fingerprint data in this embodiment of this application is not limited to the foregoing obtaining method, and another method for obtaining audio fingerprint data that represents an audio data feature and that can be obtained falls within the protection scope of the embodiments of this application.

In step 103 of this embodiment, the audio fingerprint library ingests audio fingerprint data of video data having copyright, a corresponding video label, and a time parameter corresponding to the audio fingerprint data. The video label may be specifically represented by using a video identification, for example, a sequence number or a code, for convenience of searching in the video copyright library based on the video label. Specifically, the audio fingerprint data in the audio fingerprint library may be obtained by performing audio data extraction on the video data having copyright and extracting according to the method for extracting audio fingerprint data according to this embodiment of this application. No further details are provided herein.

In this embodiment, when the audio fingerprint library does not include the audio fingerprint data, it indicates that the first video data is not consistent with video data in the video copyright library. That is, it indicates that the first video data and the video data having the copyright do not conflict, and in other words, the first video data does not have a copyright conflict with the video data having the copyright. Correspondingly, step 104 to step 107 are not performed subsequently, and a determining result indicating that the first video data is not consistent with the video data in the video copyright library may be directly obtained.

As shown by step 203 in FIG. 3, a video label and a time parameter corresponding to audio fingerprint data are obtained to be used as matching information when an audio fingerprint library includes the audio fingerprint data. The video label may be specifically represented by using a video identification, for example, a sequence number or a code. In an actual application, the audio fingerprint library stores a large quantity of information. To balance a matching time, accelerate a matching speed, and do not reduce accuracy, step 203 uses a fuzzy matching manner. That is, during matching, matching hash amounts having same audio fingerprint data and a same time difference (for example, a difference between a hash time point of inputting a video and a hash time point in the video copyright library) are counted, and the first N pieces of the matched audio fingerprint data are selected to form a potential matched audio segment. In a next stage, each segment of the matched audio fingerprint data is selected to analyze the density of a hash amount of the audio fingerprint data at a particular time. If the density is greater than a threshold, the segment is remained; otherwise, the segment is removed. A hash value segment whose density is greater than the threshold is remained. In this process, a potential audio segment having a low matching density may be removed, thereby improving the matching accuracy. De-duplication selection is performed on the selected potential matching audio segment, and for repeated audio matched in time, audio having a largest hash density is selected as final matching audio. During matching, one-to-one or one-to-many matching may be allowed. In this process, filtering may be performed when the hash density is analyzed, and only a segment of audio having the longest matching time is remained. The foregoing process may be referred to as a classification and filtering process, that is, step 204. Therefore, final matching information is obtained.

In step 105 of this embodiment, after the video label corresponding to the audio fingerprint data is obtained, the video copyright library is queried based on the video label. The video copyright library ingests a key frame picture of video data having copyright, the video label, a time parameter corresponding to the key frame picture and the like. The video copyright library is queried to obtain the first picture that is corresponding to the video label and that satisfies the time parameter, the second picture that is in the first video data and that satisfies the time parameter is extracted. Specifically, in a matching process of specific picture content of video data, the video copyright library is queried according to the video label obtained by matching the audio fingerprint data, to obtain a picture collection corresponding to the video label. A picture satisfying the time parameter (that is, the first picture) is read from the picture collection according to the time parameter obtained by matching the audio fingerprint data. Correspondingly, for the first video data, a picture that is in the first video data and that satisfies the time parameter (that is, the second picture) is extracted according to the time parameter obtained by matching the audio fingerprint data.

In this embodiment, the first feature parameter of the first picture and the second feature parameter of the second picture are separately extracted. The first feature parameter is compared with the second feature parameter to determine whether the first video data is consistent with video data in a copyright database. Specifically, the separately extracting a first feature parameter of the first picture and a second feature parameter of the second picture includes: separately extracting the first feature parameter of the first picture and the second feature parameter of the second picture according to at least one of the following manners: a SIFT manner and a HOG manner. Further, the comparing the first feature parameter with the second feature parameter, and determining, based on a comparison result, whether the first video data is consistent with a video in the video copyright library includes: calculating similarity between the first feature parameter and the second feature parameter by using the SIFT manner or the HOG manner; and determining that the first video data is consistent with the video in the video copyright library when the similarity reaches a preset threshold.

Based on an implementation of this embodiment, before the video copyright library is queried based on the video label, in other words, in a process of establishing the video copyright library, the method includes: performing picture extraction on second video data having copyright, and storing the extracted picture, a time parameter corresponding to the picture, and a video label corresponding to the picture in the video copyright library.

The performing scene identification on second video data having copyright includes: performing scene identification on the second video data, identifying and filtering a first picture collection representing scene switching in the second video data, to obtain a second picture collection; analyzing and identifying a picture in the second picture collection, to obtain edge feature information of the picture; extracting a picture of which a quantity of the edge feature information reaches a preset threshold.

Figure 4:
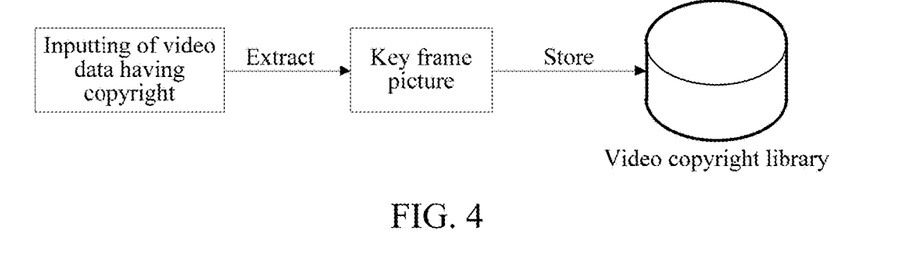
FIG. 4 is a schematic diagram of an establishing process of a video copyright library according to an embodiment of this application.

Specifically, in the process of establishing the video copyright library, key frame picture extraction is performed on all video data having copyright. FIG. 4 is a schematic diagram of an establishing process of a video copyright library according to an embodiment of this application. As shown in FIG. 4, the video data having copyright is input and a key frame picture of the input video data is extracted. A process of extracting the key frame picture of the video data includes: first, performing scene switching detection on the video data. The scene switching detection may be performed by detecting a foreground and/or a background in the picture. When it is detected that the foregrounds and/or backgrounds of two pictures are inconsistent, it may be determined that a time point between corresponding time points of the two pictures is a scene switching time point. It may also be understood that a first picture having a former time is the last picture of the previous scene, and the other picture having a later time is the first picture of a next scene. In this embodiment, scene identification is performed on the input video data, and a first picture collection representing scene switching is identified. In the process of extracting the key frame picture, first, the first picture collection is filtered from a picture collection included by the video data, to prevent that an extracted key frame picture is at a scene switching position and accuracy of subsequent picture content matching is reduced. Further, analysis and identification are further performed on remaining pictures in a remaining second picture collection. Specifically, analysis and identification are performed on complexity of the pictures, to extract a picture with high complexity as a key frame picture. In an implementation, this embodiment of this application may use analysis on picture edge feature information to find out, in the second picture collection, a picture that has a large quantity of the edge feature information. A larger quantity of the edge feature information of a picture indicates higher complexity of the picture. In a process of matching two pictures, more complex content indicates higher matching accuracy.

In an implementation, the extracting a picture of which a quantity of the edge feature information reaches a preset threshold includes: generating the picture of which the quantity of the edge feature information reaches the preset threshold into a third picture collection; and extracting a picture in the third picture collection at a preset time interval.

Specifically, in this embodiment, there may be many pictures of which the quantity of the edge feature information is large. To reduce picture storage space and a calculation amount of feature matching, a picture may be extracted as a key frame picture at the preset time interval. For example, a picture is extracted every K second. This may greatly reduce a quantity of the extracted key frame pictures, greatly reduce a picture storage quantity and the calculation amount of feature matching, and reduce calculation resource consumption of a server.

Figure 5:
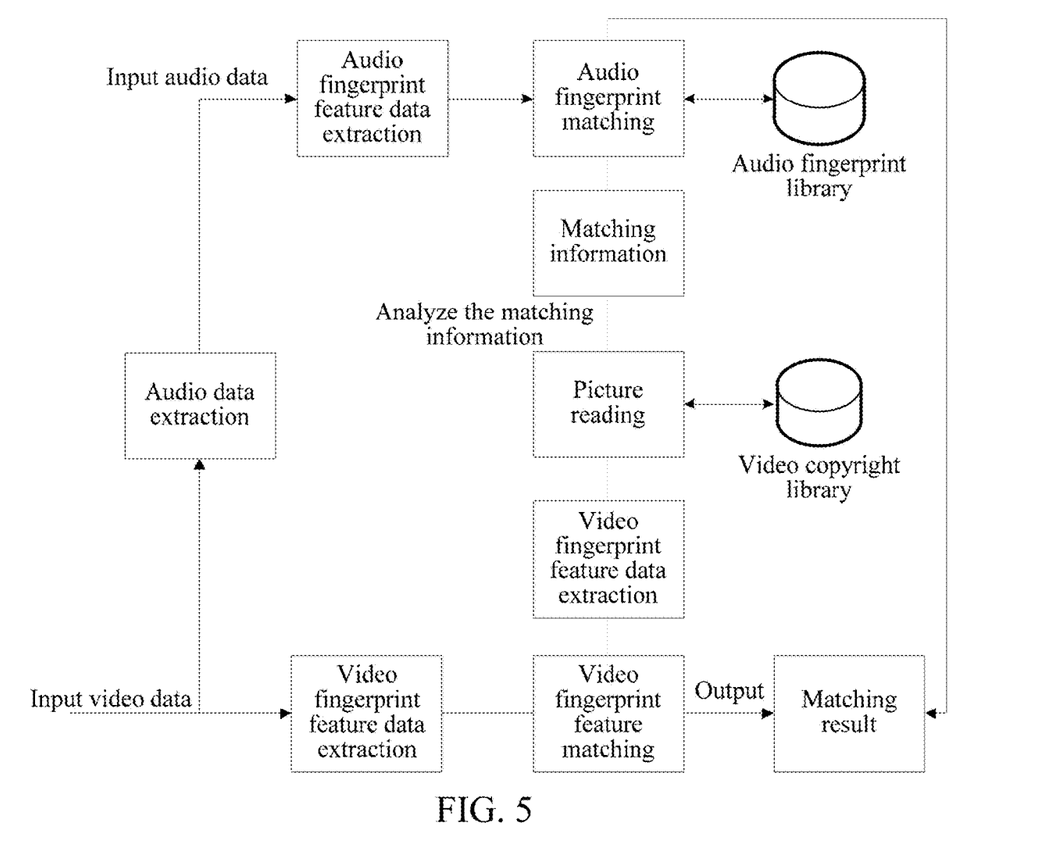
FIG. 5 is a schematic flowchart of another video detection method according to an embodiment of this application.

Based on the video detection solution described above, in short, the technical solution of this embodiment of this application focuses mainly on audio detection and subsidiarily on video detection. In other words, detection is performed by combining audio content and video content to determine whether a video to be detected and the copyright conflict. Specifically, FIG. 5 is a schematic flowchart of another video detection method according to an embodiment of this application. As shown in FIG. 5, first, audio data is extracted from video data to be detected. First, it is matched whether the audio data is consistent with audio data of video data having copyright. Specifically, audio fingerprint data of the audio data is matched with audio fingerprint data in an audio fingerprint library. If the audio fingerprint data of the audio data does not match the audio fingerprint data in the audio fingerprint library, it is determined that a matching result is that the video to be detected and the video having the copyright do not conflict. If the audio fingerprint data of the audio data matches the audio fingerprint data in the audio fingerprint library, a video label and a time parameter corresponding to the audio fingerprint data are obtained from the audio fingerprint library. Content of the video to be detected is further matched with content of the video in a video copyright library. Specifically, the video copyright library is queried based on the video label to obtain a video source. A first picture satisfying the time parameter is obtained from the video source. A picture is extracted from the video to be detected according to the time parameter to be used as a second picture. Fingerprint feature extraction is separately performed on the first picture and the second picture. Specifically, feature extraction may be performed according to a SIFT manner. In addition, feature matching is performed, and similarity between the two pictures is calculated. When the similarity obtained through calculation reaches a preset threshold, it indicates that the similarity between the two pictures is extremely high, and it may be determined that a matching result is that the video to be detected and the video having copyright conflict. When the similarity obtained through calculation does not reach a preset threshold, it indicates that the similarity between the two pictures is low, and it may be determined that the matching result is that the video to be detected and the video having copyright do not conflict.

When the matching result is that the video to be detected and the video having copyright do not conflict, it may be determined that the video data is original video data made by a user and copyright protection in an original and sharing of advertising revenue may be provided for the user, to encourage excellent video data makers, thereby providing more excellent video content for a video sharing platform. When the matching result is that the video to be detected and the video having copyright conflict, the video data to be detected has a copyright conflict. Subsequently, an operation is performed on the video data having the copyright conflict or an uploader. For example, the video data having the copyright conflict is deleted, or a legal affair negation is performed with the uploaded under a serious circumstance. Copyright protection is provided for video data having copyright to a great extent.

In the existing technology, an detection solution based on video content usually includes two of the following: 1. a space color-based video fingerprint; 2. a feature extraction-based video fingerprint.

The space color-based video fingerprint basically is a histogram of a picture in a time period in a particular area. A feature of a color varies based on different formats of a video. Consequently, the color-based video fingerprint does not have a high anti-nose capability, for example, changes such as adding a brand and a black border.

A two-dimensional discrete cosine transform (2D-DCT) video fingerprint is representative of the feature-based video fingerprint. The 2D-DCT video fingerprint is widely applied to hash-based image retrieval. Main steps of the hash-based image retrieval include: First, frame rate transforming is performed on a video at time, and the frame rate is changed into a low frame rate F (F=4). Subsequently, pictures are scaled down and then are changed into black and white pictures. The changed black and white pictures form a small segment (for example, a slice formed by J pictures) in a time domain of the video in a time length. Subsequently, TIRI is used to combine information of the time domain of continuous images of each slice, to obtain a picture. Next, the 2D-DCT is performed on the obtained picture representing the time of the time domain (for example, an 8×8 DCT). A median value is found in the transformed DCT values. A transformed fingerprint is changed into a two-dimensional vector by using a two-dimensional median value, thereby representing a feature of the video in an area.

The detection solution for space color-based video content has unfavorable accuracy and anti-nose capabilities. The detection solution for feature-based video content needs a strong calculation capability and consumes a large quantity of calculation resources. Compared with the existing detection solution for video content, the video detection solution of this embodiment of this application focuses mainly on audio fingerprint detection and subsidiarily on video fingerprint detection. This greatly decreases calculation capabilities required when only video content detection is used, reduces calculation resource consumption, overcomes a copyright protection shortcoming by merely using an audio fingerprint, and meets a video copyright protection requirement.

Figure 6A:
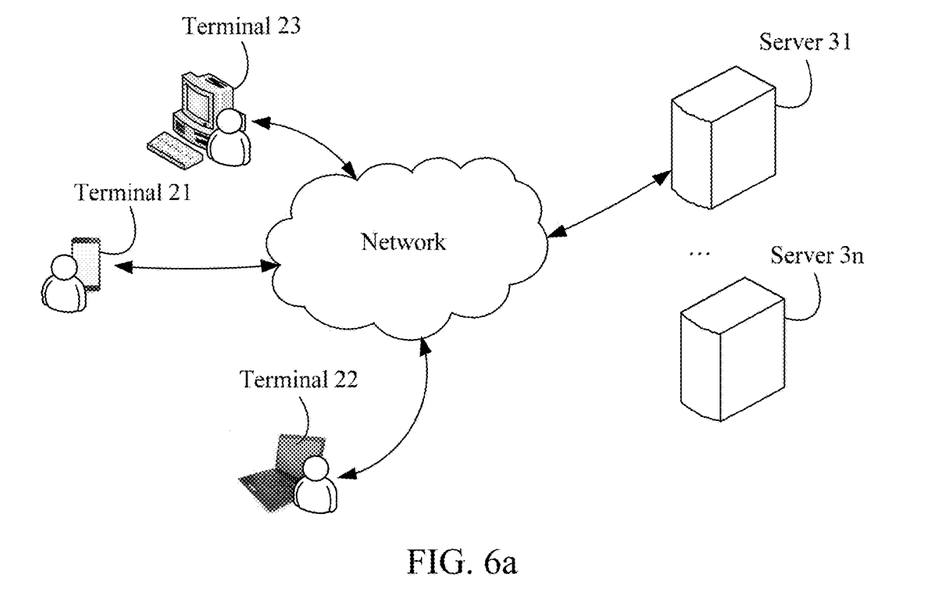
FIG. 6a and FIG. 6b are schematic diagrams of a system architecture applying a video detection method according to an embodiment of this application.
Figure 6B:
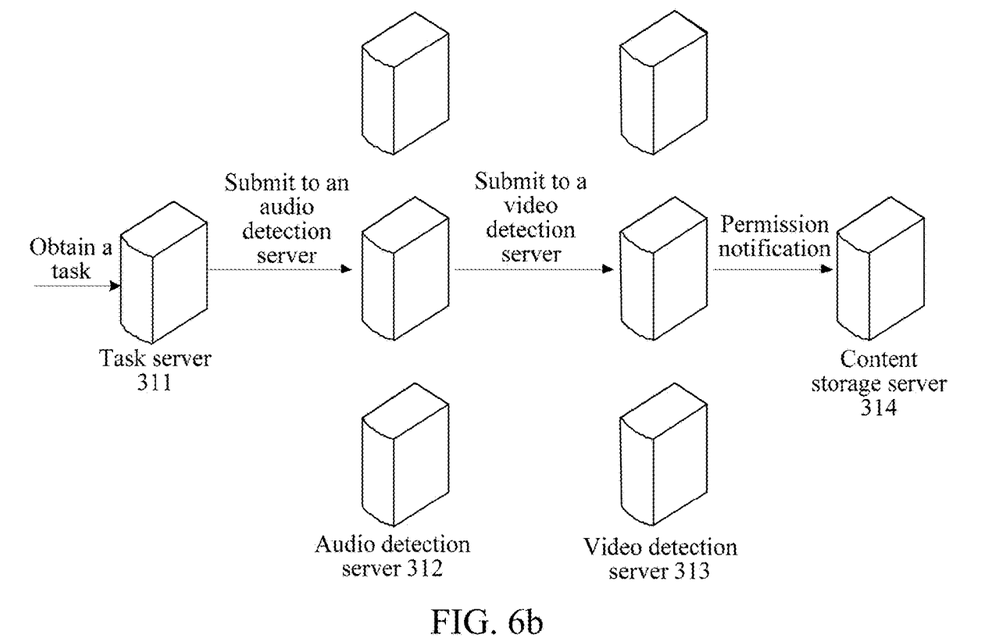

FIG. 6a and FIG. 6b are schematic diagrams of a system architecture applying a video detection method according to an embodiment of this application. As shown in FIG. 6a, servers 31, . . . , 3n and terminal devices 21-23 are included. The terminal devices 21-23 may interact with the server through a network. The terminal devices 21-23 may specifically include a mobile phone, a desktop computer, a notebook computer, and the like. The servers 31, . . . , 3n may be specifically a server cluster of a video sharing platform, and the server cluster may be implemented by using FIG. 6b. As shown in FIG. 6b, the server cluster include a task server 311, an audio detection server 312, a video detection server 313, and a content storage server 314. Specifically, after the terminal device uploads video data, the task server 311 obtains the video data and initiates an detection task. The task is submitted to the audio detection server 312 to perform audio detection and is compared with current content having an audio copyright. Videos that have copyright and that have same audio are found by using the audio detection server 312 and matching information is obtained. Further, the matching information is submitted to the video detection server 313. Subsequently, video content detection is performed on the input video and these videos that have copyright and that have the same audio, thereby determining whether audio and the video of the current video are the same as the videos that have copyright and that have the same audio. A determining result is stored in the content storage server 314. Finally, a related worker may perform a series of work related to the copyright based on content stored in the content storage server 314, for example, a legal affair negation.

Figure 7:
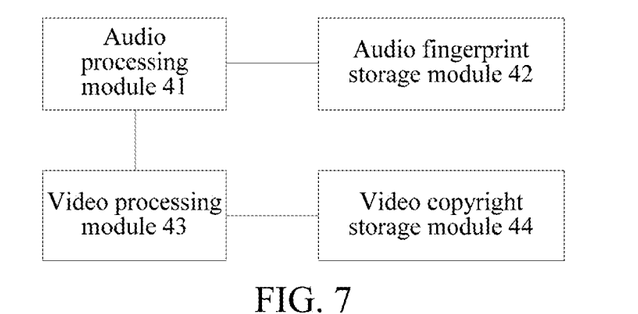
FIG. 7 is a schematic diagram of a composition structure of a server according to an embodiment of this application.

An embodiment of this application further provides a server. FIG. 7 is a schematic diagram of a composition structure of a server according to an embodiment of this application. As shown in FIG. 7, the server includes: an audio processing module 41, an audio fingerprint storage module 42, a video processing module 43, and a video copyright storage module 44.

The audio processing module 41 is configured to: obtain first video data to be detected; decode the first video data, to obtain audio data of the first video data; analyze and identify the audio data, to obtain audio fingerprint data corresponding to the audio data; and is further configured to: query, based on the audio fingerprint data, the audio fingerprint storage module 42; and obtain a video label and a time parameter corresponding to the audio fingerprint data when an audio fingerprint library includes the audio fingerprint data.

The audio fingerprint storage module 42 is configured to store the audio fingerprint data, and the corresponding video label and time parameter.

The video processing module 43 is configured to: query the video copyright storage module 44 based on the video label, to obtain a first picture that is corresponding to the video label and that satisfies the time parameter, and extract a second picture that is in the first video data and that satisfies the time parameter; separately extract a first feature parameter of the first picture and a second feature parameter of the second picture; and compare the first feature parameter with the second feature parameter, and determine, based on a comparison result, whether the first video data is consistent with a video in the video copyright library.

The video copyright storage module 44 is configured to store the video label, and the corresponding picture and time parameter.

The server in this embodiment may be an independent server or a server cluster. Based on the system architecture shown in FIG. 6a and FIG. 6b, modules in this embodiment may be implemented by using any server or server cluster in the system architecture. The server cluster may be servers shown in FIG. 6b.

In this embodiment, the first video data is video data to be detected, which may be specifically video data uploaded by a user, including an MV, a TV play, a movie, an animation video, or the like. The audio processing module 41 decodes the obtained first video data to separate the audio data of the first video data.

In this embodiment, the audio processing module 41 analyzes and identifies the audio data to obtain the audio fingerprint data corresponding to the audio data. The audio fingerprint data may be specifically quantized data representing a feature parameter of the audio data, and may be specifically represented by using a binary value. Specifically, the audio processing module 41 is configured to extract a feature parameter of the audio data, and obtain, based on the feature parameter, the audio fingerprint data corresponding to the audio data.

In an implementation, audio is a type of sound wave, so that the feature parameter of the audio data may be presented by using a sampling rate. Specifically, as shown in FIG. 3, the sampling rate of the audio data is converted to be K samples/s by converting the sampling rate. K is, for example, 8000. The collected audio data represented by one-dimensional time domain is converted into a two-dimensional diagram by using a short-time Fourier transform, as shown in FIG. 2a. A feature point that is obviously extracted in the two-dimensional diagram shown in FIG. 2a is used as an obvious feature. For example, feature points in FIG. 2b are obtained by searching peaks in a frequency spectrum. For each selected feature point, for example, a feature point A, as shown in FIG. 2c, a proper window, for example, a window area 1 in FIG. 2c, is selected based on time and frequency to perform feature hash value conversion. Specifically, for example, for the feature point A, coordinates of the feature point A are (f1, t1). A feature point with a maximum frequency domain corresponding to a time is selected in the window area 1, for example, a feature point C. Coordinates of the feature point C are (f2, t2). A hash value formed by the feature point C and the feature point A may be Hash: time=[f1:f2:$\Delta$t]:t1, where $\Delta$t=t2−t1. In this embodiment, the obtained hash value is represented as a binary value, and the binary data specifically is the audio fingerprint data corresponding to the audio data.

Certainly, the method for obtaining the audio fingerprint data by the audio processing module 41 in this embodiment of this application is not limited to the foregoing obtaining method, and another method for obtaining audio fingerprint data that represents an audio data feature and that can be obtained falls within the protection scope of the embodiments of this application.

In this embodiment, the audio fingerprint storage module 42 ingests audio fingerprint data of video data having a copyright, a corresponding video label, and a time parameter corresponding to the audio fingerprint data. The video label may be specifically represented by using a video identification, for example, a sequence number or a code, for convenience of searching in the video copyright storage module 44 based on the video label. Specifically, the audio fingerprint data in the audio fingerprint storage module 42 may be obtained by performing audio data extraction on the video data having copyright by the audio processing module 41 and extracting according to the method for extracting audio fingerprint data according to this embodiment of this application. Then the audio fingerprint data is stored in the audio fingerprint storage module 42. For the specific obtaining manner, no further details are provided herein.

In this embodiment, when the audio fingerprint storage module 42 does not include the audio fingerprint data, it indicates that the first video data is not consistent with video data in the video copyright storage module 44. That is, it indicates that the first video data and the video data having the copyright do not conflict, and in other words, the first video data does not have a copyright conflict with the video data having the copyright. Correspondingly, a process of matching the video content is not performed subsequently, and a determining result indicating that the first video data is not consistent with the video data in the video copyright storage module 44 may be directly obtained.

As shown in FIG. 3, when the audio fingerprint storage module 42 includes the audio fingerprint data, the audio processing module 41 obtains a video label and a time parameter corresponding to the audio fingerprint data. The video label may be specifically represented by using a video identification, for example, a sequence number or a code. In an actual application, the audio fingerprint library stores a large quantity of information. To balance a matching time, accelerate a matching speed, and do not reduce accuracy, a fuzzy matching manner may be used. That is, during matching, matching hash amounts having same audio fingerprint data and a same time difference (for example, a difference between a hash time point of inputting a video and a hash time point in the video copyright library) are counted, and the first N pieces of the matched audio fingerprint data are selected to form a potential matched audio segment. In a next stage, each segment of the matched audio fingerprint data is selected to analyze the density of a hash amount of the audio fingerprint data at a particular time. If the density is greater than a threshold, the segment is remained; otherwise, the segment is removed. A hash value segment whose density is greater than the threshold is remained. In this process, a potential audio segment having a low matching density may be removed, thereby improving the matching accuracy. De-duplication selection is performed on the selected potential matching audio segment, and for repeated audio matched in time, audio having a largest hash density is selected as final matching audio. During matching, one-to-one or one-to-many matching may be allowed. In this process, filtering may be performed when the hash density is analyzed, and only a segment of audio having the longest matching time is remained. The foregoing process may be referred to as a classification and filtering process. Therefore, final matching information is obtained.

In this embodiment, after the audio processing module 41 obtains the video label corresponding to the audio fingerprint data, the video label and the corresponding time parameter are sent to the video processing module 43. The video processing module 43 queries the video copyright storage module 44 based on the video label. The video copyright storage module 44 ingests a key frame picture of video data having copyright, a video label, a time parameter corresponding to the key frame picture, and the like. The video processing module 43 queries the video copyright storage module 44, to obtain a first picture that is corresponding to the video label and that satisfies the time parameter, and extracts a second picture that is in the first video data and that satisfies the time parameter. Specifically, in a matching process of specific picture content of video data, the video copyright storage module 44 is queried according to the video label obtained by matching the audio fingerprint data, to obtain a picture collection corresponding to the video label. A picture satisfying the time parameter (that is, the first picture) is read from the picture collection according to the time parameter obtained by matching the audio fingerprint data. Correspondingly, for the first video data, a picture that is in the first video data and that satisfies the time parameter (that is, the second picture) is extracted according to the time parameter obtained by matching the audio fingerprint data.

In this embodiment, the first feature parameter of the first picture and the second feature parameter of the second picture are separately extracted. The first feature parameter is compared with the second feature parameter to determine whether the first video data is consistent with video data in a copyright database. Specifically, the video processing module 43 is configured to separately extract the first feature parameter of the first picture and the second feature parameter of the second picture according to at least one of the following manners: a SIFT manner and a HOG manner. Further, the video processing module 43 is configured to calculate similarity between the first feature parameter and the second feature parameter by using the SIFT manner or the HOG manner; and determine that the first video data is consistent with the video in the video copyright library when the similarity reaches a preset threshold.

Based on an implementation of this embodiment, before the video copyright storage module 44 is queried based on the video label, in other words, in a process of establishing the video copyright storage module 44, the video processing module 43 is further configured to: perform picture extraction on second video data having copyright, and storing the extracted picture, a time parameter corresponding to the picture, and a video label corresponding to the picture in the video copyright storage module 44.

The video processing module 43 is configured to: perform scene identification on the second video data, identify and filter a first picture collection representing scene switching in the second video data, to obtain a second picture collection; analyze and identify a picture in the second picture collection, to obtain edge feature information of the picture; extract a picture of which a quantity of the edge feature information reaches a preset threshold.

Specifically, in the process of establishing the video copyright storage module 44, key frame picture extraction is performed on all video data having copyright. As shown in FIG. 4, the video data having copyright is input and the video processing module 43 extracts a key frame picture of the input video data. A process of extracting the key frame picture of the video data includes: first, performing scene switching detection on the video data. The scene switching detection may be performed by detecting a foreground and/or a background in the picture. When it is detected that the foregrounds and/or backgrounds of two pictures are inconsistent, it may be determined that a time point between corresponding time points of the two pictures is a scene switching time point. It may also be understood that a first picture having a former time is the last picture of the previous scene, and the other picture having a later time is the first picture of a next scene. In this embodiment, scene identification is performed on the input video data, and a first picture collection representing scene switching is identified. In the process of extracting the key frame picture, first, the first picture collection is filtered from a picture collection included by the video data, to prevent that an extracted key frame picture is at a scene switching position and accuracy of subsequent picture content matching is reduced. Further, the video processing module 43 further analyzes and identifies remaining pictures in a remaining second picture collection. Specifically, analysis and identification are performed on complexity of the pictures, to extract a picture with high complexity as a key frame picture. In an implementation, this embodiment of this application may use analysis on picture edge feature information to find out, in the second picture collection, a picture that has a large quantity of the edge feature information. A larger quantity of the edge feature information of a picture indicates higher complexity of the picture. In a process of matching two pictures, more complex content indicates higher matching accuracy.

In an implementation, the video processing module 43 is configured to: generate the picture of which the quantity of the edge feature information reaches the preset threshold into a third picture collection; and extract a picture in the third picture collection at a preset time interval.

Specifically, in this embodiment, there may be many pictures of which the quantity of the edge feature information is large. To reduce picture storage space and a calculation amount of feature matching, the video processing module 43 may extract a picture as a key frame picture at the preset time interval. For example, a picture is extracted every K second. This may greatly reduce a quantity of the extracted key frame pictures, greatly reduce a picture storage quantity and the calculation amount of feature matching, and reduce calculation resource consumption of a server.

In this embodiment, in an actual application, the audio processing module 41 and the video processing module 43 may be implemented by a central processing unit (CPU), a digital signal processor (DSP), a microcontroller unit (MCU), or a field-programmable gate array (FPGA). In an actual application, the audio fingerprint storage module 42 and the video copyright storage module 44 may be implemented by a memory in the server.

In the technical solution of this embodiment of this application, by combining audio content detection and video content detection, and by focusing mainly on audio content detection and subsidiarily on video content detection, calculation capabilities required when only video content detection is used are greatly decreased, calculation resource consumption is reduced, a copyright protection shortcoming by merely using an audio fingerprint is overcome, and a video copyright protection requirement is met.

Figure 8:
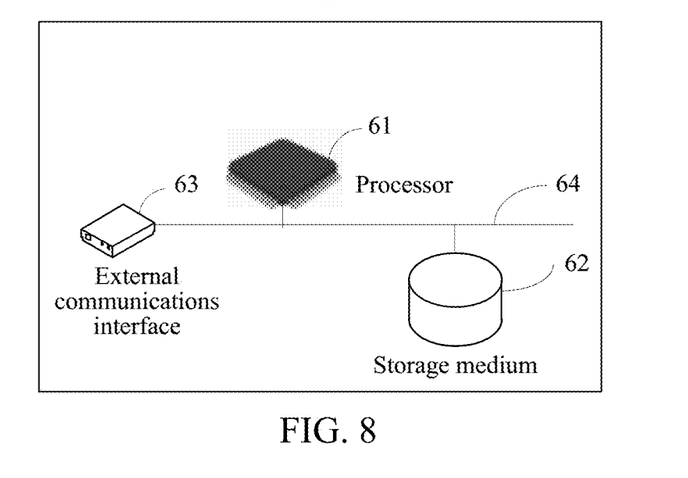
FIG. 8 is a schematic diagram of a composition structure of a server used as hardware according to an embodiment of this application.

An example indicating that the server in this embodiment serves as a hardware entity is shown in FIG. 8. The apparatus includes a processor 61, a storage medium 62, and at least one external communications interface 63. The processor 61, the storage medium 62, and the external communications interface 63 are connected to each other by using a bus 64.

It needs to be noted that, the foregoing descriptions related to the server item are similar to the foregoing method descriptions. Descriptions of a beneficial effect of a same method are not further described. For technical details that are not disclosed in the server embodiments of this application, refer to the method embodiments of this application.

A person skilled in the art should understand that the embodiments of this application may be provided as a method, a system, or a computer program product. Therefore, this application may use a form of a hardware embodiment, a software embodiment, or an embodiment combining software and hardware. Moreover, this application may use a form of a computer program product that is implemented on one or more computer-usable storage media (including but not limited to a magnetic disk memory, an optical memory, and the like) that include computer-usable program code.

This application is described with reference to flowcharts and/or block diagrams of the method, the device (the system), and the computer program product in the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The foregoing descriptions are merely preferred embodiments of this application, but are not used to limit the protection scope of this application.

What is claimed is:

1. A video detection method, comprising:
    obtaining, by a server, first video data to be detected, and decoding, by the server, the first video data, to obtain audio data of the first video data;
    analyzing and identifying, by the server, the audio data, to obtain audio fingerprint data corresponding to the audio data;
    extracting, by the server, a picture corresponding to a predefined scene switching in second video data having copyright, further including:
        performing, by the server, scene identification on the second video data, and identifying and filtering a first picture collection representing the predefined scene switching in the second video data, to obtain a second picture collection;
        analyzing and identifying, by the server, a picture in the second picture collection, to obtain edge feature information of the picture in the second picture collection; and
        extracting, by the server, a picture of which a quantity of the edge feature information reaches a preset threshold; and
    storing the extracted picture, a time parameter corresponding to the extracted picture, and a video label corresponding to the extracted picture in a video copyright library;
    querying, by the server based on the audio fingerprint data, an audio fingerprint library, wherein the audio fingerprint library stores audio fingerprint data of copyrighted video data and video labels and time parameters corresponding to the audio fingerprint data; and
    in accordance with a determination that the audio fingerprint data exists in the audio fingerprint library:
        obtaining, by the server, a video label and a time parameter corresponding to the audio fingerprint data from the audio fingerprint library;
        querying, by the server, the video copyright library based on the video label, to obtain a first picture that is corresponding to the video label and that satisfies the time parameter, and extracting a second picture that is in the first video data and that satisfies the time parameter;
        separately extracting, by the server, a first feature parameter of the first picture and a second feature parameter of the second picture; and
        comparing, by the server, the first feature parameter with the second feature parameter, and determining, based on a comparison result, whether the first video data is consistent with a video in the video copyright library.

2. The method according to claim 1 wherein the extracting, by the server, a picture of which a quantity of the edge feature information reaches a preset threshold comprises:
    generating, by the server, the picture of which the quantity of the edge feature information reaches the preset threshold into a third picture collection; and
    extracting, by the server, a picture in the third picture collection at a preset time interval.

3. The method according to claim 1, wherein the analyzing and identifying, by the server, the audio data, to obtain audio fingerprint data corresponding to the audio data comprises:
    extracting, by the server, a feature parameter of the audio data, and obtaining, based on the feature parameter, the audio fingerprint data corresponding to the audio data.

4. The method according to claim 1, wherein the separately extracting, by the server, a first feature parameter of the first picture and a second feature parameter of the second picture comprises: separately extracting, by the server, the first feature parameter of the first picture and the second feature parameter of the second picture according to at least one of the following manners:
    a scale-invariant feature transform SIFT manner and a histogram of oriented gradient HOG manner.

5. The method according to claim 1, wherein the comparing, by the server, the first feature parameter with the second feature parameter, and determining, based on a comparison result, whether the first video data is consistent with a video in the video copyright library comprises:
calculating, by the server, similarity between the first feature parameter and the second feature parameter; and determining that the first video data is consistent with the video in the video copyright library when the similarity reaches a preset threshold.

6. The method according to claim 1, wherein the audio fingerprint data is quantized data representing a feature parameter of the audio data.

7. A server, comprising at least one processor and a memory storing a processor-executable instruction, the instruction, when executed by the at least one processor, causing the server to perform the following operations:
obtaining first video data to be detected;
decoding the first video data, to obtain audio data of the first video data;
analyzing and identifying the audio data, to obtain audio fingerprint data corresponding to the audio data;
extracting, by the server, a picture corresponding to a predefined scene switching in second video data having copyright, further including:
performing, by the server, scene identification on the second video data, and identifying and filtering a first picture collection representing the predefined scene switching in the second video data, to obtain a second picture collection;
analyzing and identifying, by the server, a picture in the second picture collection, to obtain edge feature information of the picture in the second picture collection; and
extracting, by the server, a picture of which a quantity of the edge feature information reaches a preset threshold; and
storing the extracted picture, a time parameter corresponding to the extracted picture, and a video label corresponding to the extracted picture in a video copyright library;
querying, based on the audio fingerprint data, an audio fingerprint library, wherein the audio fingerprint library stores audio fingerprint data of copyrighted video data and video labels and time parameters corresponding to the audio fingerprint data; and;
in accordance with a determination that the audio fingerprint data exists in the audio fingerprint library:
obtaining a video label and a time parameter corresponding to the audio fingerprint data from the audio fingerprint library;
querying a video copyright library based on the video label, to obtain a first picture that is corresponding to the video label and that satisfies the time parameter, and extracting a second picture that is in the first video data and that satisfies the time parameter;
separately extracting a first feature parameter of the first picture and a second feature parameter of the second picture; and
comparing the first feature parameter with the second feature parameter, and determining, based on a comparison result, whether the first video data is consistent with a video in the video copyright library.

8. The server according to claim 7, wherein the server is further configured to perform the following operations:
generating the picture of which the quantity of the edge feature information reaches the preset threshold into a third picture collection; and
extracting, by the server, a picture in the third picture collection at a preset time interval.

9. The server according to claim 7, wherein the server is further configured to perform the following operations: extracting a feature parameter of the audio data, and obtaining, based on the feature parameter, the audio fingerprint data corresponding to the audio data.

10. The server according to claim 7, wherein the server is further configured to perform the following operations: separately extracting the first feature parameter of the first picture and the second feature parameter of the second picture according to at least one of the following manners: a scale-invariant feature transform SIFT manner and a histogram of oriented gradient HOG manner.

11. The server according to claim 7, wherein the server is further configured to perform the following operations:
calculating similarity between the first feature parameter and the second feature parameter; and
determining that the first video data is consistent with the video in the video copyright library when the similarity reaches a preset threshold.

12. The server according to claim 7, wherein the audio fingerprint data is quantized data representing a feature parameter of the audio data.

13. A non-transitory storage medium, configured to store one or more computer programs, the computer programs comprising an instruction that can be run by a possessor comprising one or more memories, the instruction, when executed by a computer, causing the computer to perform the following operations:
obtaining first video data to be detected, and decoding the first video data, to obtain audio data of the first video data;
analyzing and identifying the audio data, to obtain audio fingerprint data corresponding to the audio data;
extracting, by the server, a picture corresponding to a predefined scene switching in second video data having copyright, further including:
performing, by the server, scene identification on the second video data, and identifying and filtering a first picture collection representing the predefined scene switching in the second video data, to obtain a second picture collection;
analyzing and identifying, by the server, a picture in the second picture collection, to obtain edge feature information of the picture in the second picture collection; and
extracting, by the server, a picture of which a quantity of the edge feature information reaches a preset threshold; and
storing the extracted picture, a time parameter corresponding to the extracted picture, and a video label corresponding to the extracted picture in a video copyright library;
querying, based on the audio fingerprint data, an audio fingerprint library, wherein the audio fingerprint library stores audio fingerprint data of copyrighted video data and video labels and time parameters corresponding to the audio fingerprint data and;
in accordance with a determination that the audio fingerprint data exists in the audio fingerprint library:
obtaining a video label and a time parameter corresponding to the audio fingerprint data from the audio fingerprint library;
querying a video copyright library based on the video label, to obtain a first picture that is corresponding to the video label and that satisfies the time parameter, and extracting a second picture that is in the first video data and that satisfies the time parameter;

separately extracting a first feature parameter of the first picture and a second feature parameter of the second picture; and comparing the first feature parameter with the second feature parameter, and determining, based on a comparison result, whether the first video data is consistent with a video in the video copyright library.

14. The method according to claim 13, wherein the extracting the picture of which a quantity of the edge feature information reaches a preset threshold comprises:

generating a picture of which the quantity of the edge feature information reaches the preset threshold into a third picture collection; and extracting a picture in the third picture collection at a preset time interval.

* * * * *